United States Patent
Chen et al.

(10) Patent No.: US 12,491,634 B2
(45) Date of Patent: Dec. 9, 2025

(54) MOBILE OBJECT HANDLING WORKSTATION WITH ADVANCED NETWORK CAPABILITIES

(71) Applicant: INTELLIGRATED HEADQUARTERS, LLC, Mason, OH (US)

(72) Inventors: En Yi Chen, Charlotte, NC (US); Hai Qi Zhang, Charlotte, NC (US); Kian Weng Teh, Charlotte, NC (US); Wei Shi, Charlotte, NC (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 407 days.

(21) Appl. No.: 18/069,692

(22) Filed: Dec. 21, 2022

(65) Prior Publication Data
US 2023/0226690 A1 Jul. 20, 2023

(30) Foreign Application Priority Data
Jan. 14, 2022 (CN) .......................... 202210041727.9

(51) Int. Cl.
*B25J 9/16* (2006.01)
*H04L 67/12* (2022.01)

(52) U.S. Cl.
CPC ............ *B25J 9/1664* (2013.01); *H04L 67/12* (2013.01); *G05B 2219/31281* (2013.01); *G05B 2219/39001* (2013.01)

(58) Field of Classification Search
CPC .......... B25J 9/664; G05B 2219/31281; G05B 2219/39001; G06Q 10/087; H04L 67/12; H04W 88/10
See application file for complete search history.

(56) References Cited

U.S. PATENT DOCUMENTS

| 2009/0074545 A1* | 3/2009 | Lert, Jr. .............. B65G 1/1378 414/267 |
| 2017/0164349 A1 | 6/2017 | Zhu et al. |

(Continued)

FOREIGN PATENT DOCUMENTS

WO  2020/185794 A1  9/2020

OTHER PUBLICATIONS

EP Office Action Mailed on Oct. 4, 2024 for EP Application No. 22213651, 8 page(s).

(Continued)

*Primary Examiner* — Kidest Worku
(74) *Attorney, Agent, or Firm* — ALSTON & BIRD LLP

(57) ABSTRACT

Various embodiments are directed to operator workstations that improve efficiency of handling operations at an object handling environment. In one aspect, an operator workstation for handling a plurality of objects is provided. The operator workstation includes a workbench platform having a configurable number of sub-platforms upon which objects can be disposed. The operator workstation further includes a plurality of sensors configured to collect sensor data for detection of object presences and object states of objects disposed upon the workbench platform. The operator workstation further includes a plurality of equipment configured to control movement of objects disposed upon the workbench platform. In various embodiments, different subsets of the sensors and equipment are configured for network communication via different network services provided by a wireless network. For instance, network communication may be provided to different sensors and equipment via different network slices of a $5^{th}$ generation new radio (5G) cellular network.

10 Claims, 10 Drawing Sheets

(56) References Cited

U.S. PATENT DOCUMENTS

| | | | |
|---|---|---|---|
| 2018/0247257 A1* | 8/2018 | Lert, Jr. | G06Q 10/087 |
| 2019/0375591 A1* | 12/2019 | Garcia | B65G 1/1373 |
| 2020/0331645 A1* | 10/2020 | Almogy | B65G 1/1376 |
| 2022/0086864 A1 | 3/2022 | Sabella et al. | |
| 2023/0226696 A1* | 7/2023 | Mandlekar | B25J 9/1682 |
| | | | 700/264 |

OTHER PUBLICATIONS

European search report Mailed on May 12, 2023 for EP Application No. 22213651, 13 page(s).

Huawei Technologies, "Vision on 5G Radio Access Technologies," 3GPP RAN Workshop on 5G, 18 pgs., (Sep. 17-18, 2015).

Zaidi et al., "Waveform and Numerology to Support 5G Services and Requirements," IEEE Communications, 54(11):90-98, (Nov. 1, 2016).

* cited by examiner

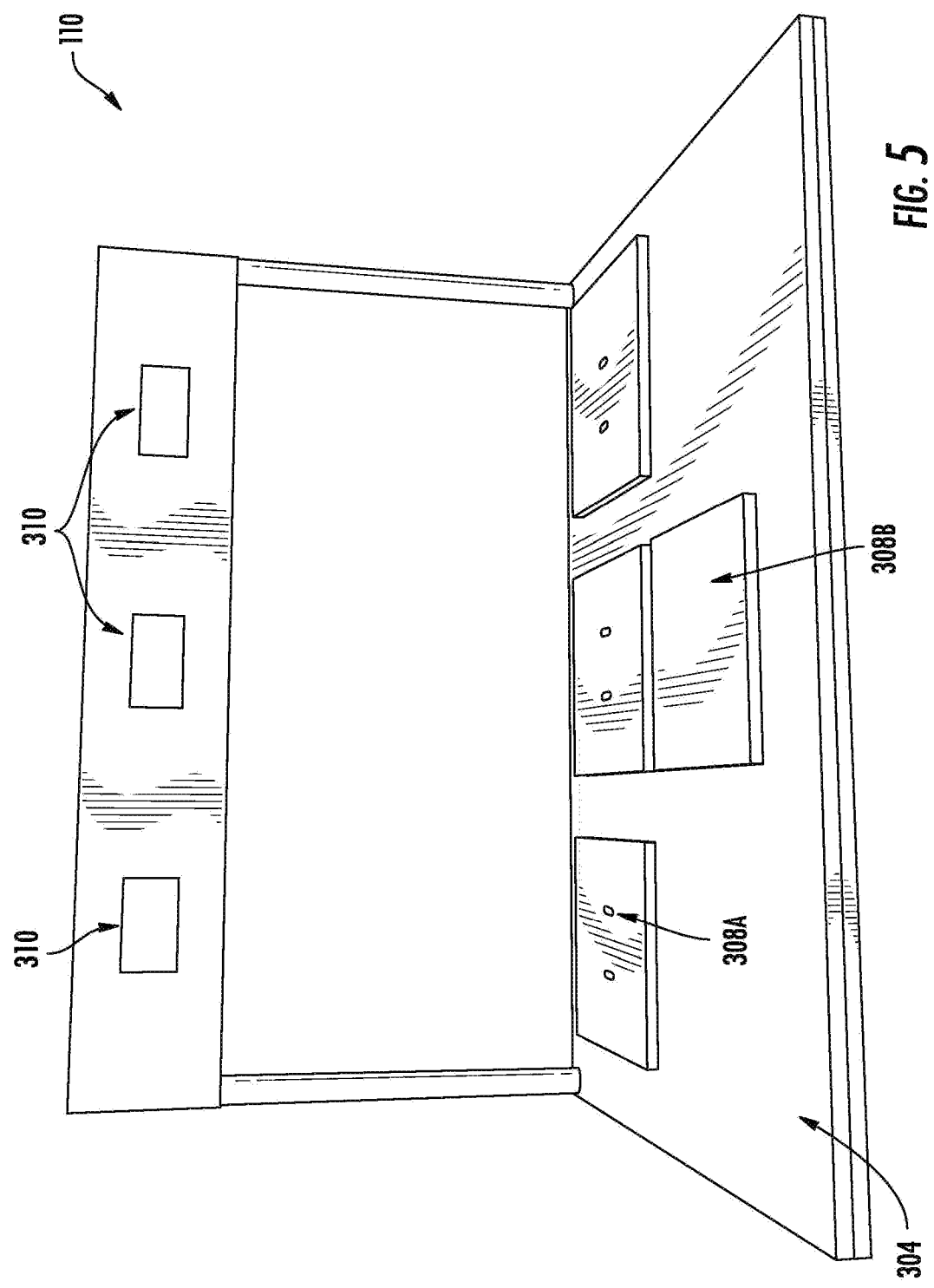

FIG. 6B

CONFIGURATION GENERATOR

| ITEM CATEGORY | ITEM NUMBER | ITEM WEIGHT | TIME OF PER OPERATION |
|---|---|---|---|
| MENG NIU | 5000 | 0.52kg | 10m |
| YI LI | 15000 | 0.82kg | 8m |
| SAN YUAN | 7500 | 1.23kg | 7m |
| BRIGHT DAIRY | 18000 | 0.75kg | 9m |

[GENERATE CONFIGURATION]

NUMBER OF OPERATORS: 5

NUMBER OF WORK STATIONS: 3

LENGTH OF FLUENT FRAME: 8

......

MOBILE OBJECT HANDLING WORKSTATION WITH ADVANCED NETWORK CAPABILITIES

CROSS-REFERENCE TO RELATED APPLICATIONS

This application claims priority pursuant to 35 U.S.C. 119(a) to Chinese Application No. 202210041727.9, filed Jan. 14, 2022, which application is incorporated herein by reference in its entirety.

FIELD OF THE INVENTION

Various embodiments described herein relate generally to object handling and processing in environments such as warehouses, distribution centers, and/or the like, and to the efficiency thereof.

BACKGROUND

At any point in time, object handling environments, such as but not limited to distribution centers, warehouses, and inventories, include some volume of objects for handling and processing. With the handling of objects, the volume of objects at an object handling environment may fluctuate over time, and at some extremes, the volume of objects may reach and/or exceed a capacity of the object handling environment. Various issues and challenges arise from reaching and/or exceeding capacities of object handling environments, including but not limited to objects becoming lost, object handling becoming delayed, and objects degrading (e.g., food spoilage). Through applied effort, ingenuity, and innovation, the problems and technical challenges identified herein have been solved by developing solutions that are included in embodiments of the present disclosure, many examples of which are described in detail herein.

BRIEF SUMMARY

Various embodiments described herein relate to mobile operator workstations configured with advanced network capabilities. In various examples, exemplary mobile operator workstations as described herein can be used to efficiently handle objects and to improve efficiency of object handling workflows. According to an aspect of the present disclosure, an operator workstation for handling a plurality of objects is provided, and the operator workstation includes a workbench platform having a configurable number of sub-platforms configured for at least one object of the plurality of objects to be disposed upon. The operator workstation further includes a plurality of sensors configured to collect sensor data for detection of an object presence and an object state of the at least one object being disposed upon the workbench platform. The operator workstation further includes a plurality of equipment configured to control movement of the at least one object being disposed upon the workbench platform. The plurality of sensors and the plurality of equipment include one or more first sensors and equipment configured for network communication via a first network service provided by one or more wireless networks. The plurality of sensors and the plurality of equipment further include one or more second sensors and equipment configured for network communication via a second network service provided by the one or more wireless networks. The plurality of sensors and the plurality of equipment further include one or more third sensors and equipment configured for network communication via a third network service provided by the one or more wireless networks.

In various embodiments, the first network service is associated with high bandwidth communication requirements, the second network service is associated with low power high density communication requirements, and the third network service is associated with reliability and low latency communication requirements. In various embodiments, the plurality of equipment includes one or more robotic operators remotely controlled through the network communication via the third network service to perform handling operations with the at least one object being disposed upon the workbench platform. In various embodiments, the one or more wireless networks comprises a 5th generation new radio (5G) network. In various embodiments, each of the first network service, the second network service, and the third network service is provided by a network slice of the 5G network.

In various embodiments, the configurable number of foldable sub-platforms is determined based at least in part on a handling workflow associated with the plurality of objects. In various embodiments, the operator workstation further includes mobility means operable to position the operator workstation adjacent to one or more object supply systems. The at least one object disposed upon the workbench platform originates from the one or more object supply systems. In various embodiments, the one or more object supply systems are remotely controlled through the network communications via the third network service.

According to another aspect of the present disclosure, an operator workstation for handling a plurality of objects is provided. The operator workstation includes a workbench platform configured for at least one object of the plurality of objects to be disposed upon. The workbench platform includes a number of foldable sub-platforms. The operator workstation further includes a plurality of sensors configured to collect sensor data for detection of an object presence and an object state of the at least one object being disposed upon the workbench platform. The workbench platform further includes one or more displays controlled to indicate (i) the object state of each of the at least one object being disposed upon the workbench platform, and (ii) the number of foldable sub-platforms determined based at least in part on an operation workflow associated with the plurality of objects.

In various embodiments, the one or more displays are controlled to further indicate instructions for performing one or more handling operations of the operation workflow associated with the plurality of objects.

In various embodiments, the number of displays that are controlled is based at least in part on at least one of: a number of concurrent handling operations being performed at the operator workstation, a number of the at least one object being disposed upon the workbench platform, or a number of operators at the operator workstation.

BRIEF DESCRIPTION OF THE DRAWINGS

Reference will now be made to the accompanying drawings, which are not necessarily drawn to scale, and wherein:

FIG. 5 illustrates an exemplary operator workstation including sensors for detection of object presences and object states and including displays for indicating handling instructions, object states, handling workflows, and/or the like, in accordance with various embodiments of the present disclosure.

FIGS. 6A and 6B illustrate example interfaces that may be displayed via displays of an exemplary operator workstation, in accordance with various embodiments of the present disclosure.

DETAILED DESCRIPTION

Figure 1A:
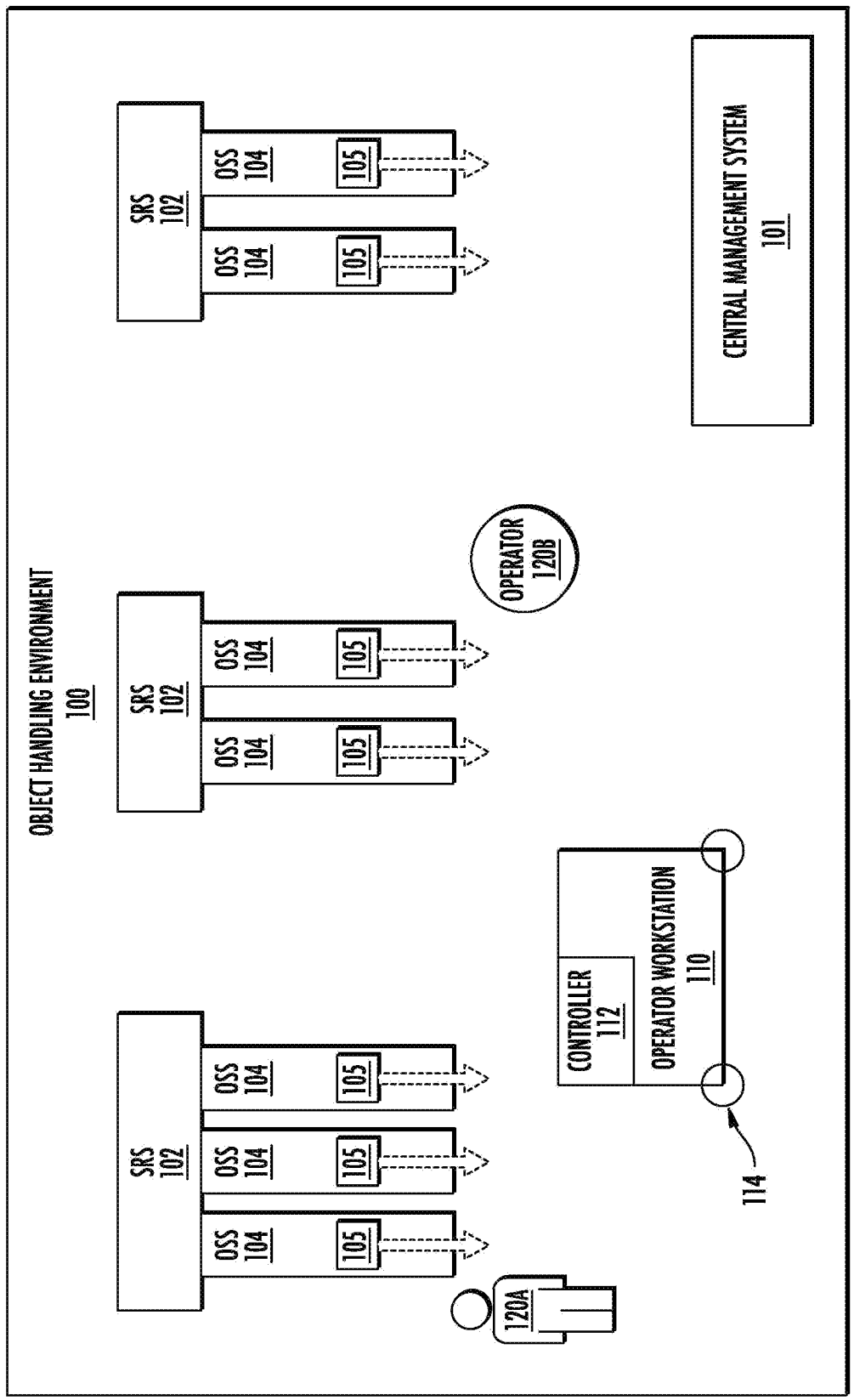
FIG. 1A provides a diagram illustrating an overview of an object handling environment within which an operator workstation may be used in handling objects, in accordance with various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Generally, object handling environments may serve as intermediary or transient locations at which objects are handled and processed before being transported to a desired destination. In various examples discussed herein, examples of object handling environments include, but are not limited to, distribution centers, shipping centers, warehouses, inventories, assembly factories, and/or the like at which objects may be packaged, assembled, modified, manipulated, transformed, refrigerated, prepared for transportation, or otherwise handled. In various examples, an object handling environment may store a volume of objects in preparation and in interim for their handling and/or processing; however, excess storage of objects can have undesirable effects (e.g., lost objects, handling delays, object degradation).

Thus, an object handling environment may be generally associated with an object capacity, indicative of how many objects can be present at the object handling environment while maintaining reliability of the handling operations of the object handling environment. At some points in time, the actual volume of objects present at the object handling environment may approach or even exceed the object capacity. In some examples, such increases in the number of objects stored at an object handling environment may be a consequence of inefficiencies in handling operations at the object handling environment. Further, increases in demand (e.g., during a promotion, holiday, or shopping season) can exacerbate a large buildup of objects within an object handling environment.

Thus, various embodiments described herein generally relate to improving the efficiency of handling operations at an object handling environment such that undesired effects including loss of objects, handling and transportation delays, and object degradation are minimized. In particular, various embodiments of the present disclosure provide operator workstations configured to improve efficiency of the performance of handling operations by operators within an object handling environment.

Example operator workstations described herein are compact and modular, such that adequate space remains for object inventory within an object handling environment. Similar to their modularity, operator workstations are scalable to enable simultaneous or near-simultaneous performance of different handling operations, thereby maintaining the object handling environment's efficiency during peak periods of time. In various embodiments, the compactness, modularity, and scalability of an operator workstation are realized at least in part through its workbench platform upon which objects may be disposed and where handling operations can be performed. Specifically, in various embodiments, a workbench platform of an operator workstation is comprised of one or more foldable sub-platforms, allowing for compact configurations when not in use and for expansion of surface area for performance of handling operations.

Various embodiments described herein enable high throughput of handling operations and therefore significantly decrease risks of an object handling environment reaching its object capacity. It may be recognized that increase of handling throughput may have less adverse effects compared to other techniques for minimizing risk of exceeding an object capacity. For example, increasing the size of a warehouse to avoid easily reaching its increased capacity can simply lead to more objects becoming lost. Further, resorting to large warehouses is associated with high costs, as such large warehouses may be idle for some time periods.

In various embodiments, example operator workstations provide high adaptability to different applications and even to different object handling environments. In various examples, an operator workstation requires minimal infrastructural support and resources from an object handling environment and can itself function using existing networks, including broadband cellular networks. In various embodiments, various components of the operator workstation are configured for wireless communication via a $5^{th}$ generation new radio network, and as such, an operator workstation is not necessarily restricted or confined to specific communication infrastructure (e.g., wiring, wall ports, and/or the like) within an object handling environment. Further mobility of example operator workstations is promoted via mobility means, enabling the example operator workstations to move or to be moved to different specific locations within an object handling environment for different uses.

Operator workstations in accordance with the present disclosure are further configured to provide improved accuracy and traceability in the performance of handling operations within an object handling environment. A plurality of sensors or data collection devices, such as cameras, weight sensors, laser detectors, temperature sensors, and/or the like, enable detection of object characteristics and features for verifying that certain handling operations have been properly completed. Accordingly, sensor data collected by such devices of an operator workstation during performance of handling operations enables improved monitoring of the objects present within an object handling environment. In various embodiments, certain sensors and other equipment of the operator workstation communicate via different network slices of wireless network for improved transmission of sensor data.

Thus, generally, various embodiments of the present disclosure describe operator workstations that provide improved technical effects within an object handling environment. Referring now to FIG. 1A, an example diagram of an object handling environment 100 is provided, and FIG. 1A illustrates an operator workstation 110 within the object handling environment 100 and configured to improve the efficiency of handling operations performed within the object handling environment 100.

In some examples, the object handling environment 100 is associated with a central management system 101, which may include one or more computing devices configured to process data, communicate with various other systems, and perform operations related to the overall functioning of the object handling environment 100. For example, the central management system 101 may track the supply and transportation of objects to and from the object handling environment 100, maintain an inventory of different object types and/or individual objects (e.g., via store keeping units, or SKUs), assign tasks among different operators working within the object handling environment 100, provide analytic reports of operations within the object handling environment 100, predict a volume of objects present within the object handling environment 100, and/or the like.

In various embodiments, the central management system 101 can be located within the object handling environment 100 and be used by an operator (e.g., a supervisor, a superintendent) present at the object handling environment. In other examples, the central management system 101 may be remotely positioned and may be responsible for the management of different object handling environments 100. For a given object handling environment 100, the central management system 101 may be in communication with different systems, entities, devices, and/or the like within the given object handling environment 100 in order to fulfill its duties, and specifically may communicate with at least some of the different systems, entities, devices, and/or the like via a wireless network, as will be discussed below in the present disclosure.

With the object handling environment 100 being responsible for handling of a volume of objects 105, the object handling environment 100 may be configured to, and may include various systems and/or machinery, for the storage of the volume of objects 105, in various examples. In the illustrated embodiment, the object handling environment 100 includes one or more storage and retrieval systems (SRSs) 102 and object supply systems (OSSs) 104 for the storage, retrieval, and transportation of objects 105 throughout various locations within the object handling environment 100. In various examples, SRSs 102 may include palletizers, robotic arms, truck loaders/unloaders, shelving apparatuses, and/or the like configured to store and/or organize a volume of objects 105 throughout the object handling environment 100. It will be appreciated that in some examples, objects 105 may also be manually stored and organized by human operators.

In various embodiments, the SRSs 102 are further configured to retrieve objects 105 from their storage positions and to interface with one or more OSSs 104 for transportation of retrieved objects throughout the object handling environment 100. Examples of OSSs 104 and components thereof include conveyor systems, conveyor overhead units and sensors, singulation systems, sorting systems (e.g., paddle sorters, pusher/puller sorters, pop-up transfer sorters, cross-belt sorters), accumulation systems, diverter systems, chutes, and/or the like configured to transport objects 105. In some examples, an OSS 104 is configured to discriminatively transport objects 105 based at least in part on a detected object type and/or some feature of said objects. It will be recognized here that human operators and/or human-operated machinery can also be used to transport objects 105 throughout the object handling environment 100.

In various embodiments, the objects 105 being stored, transported, and later handled within the object handling environment 100 may include various assembly components, goods for sale, food items, packing materials (e.g., cartons, totes, boxes), refrigeration or cooling agents, desiccant packets, and/or the like. In some example instances, each object 105 may be identifiable via a store keeping unit (SKU), which may be labelled or otherwise visually indicated on and/or near the object 105.

Objects 105 of the same category or type may be stored and transported (via SRS 102 and OSS 104) together. Different objects 105 may also be transported together and/or to a common location based at least in part on a desired handling operation. For instance, certain assembly components to be assembled together may be transported via OSSs 104 to a common location within the object handling environment, or as another example, a certain good may be transported alongside packing materials and a cooling agent to a common location for packaging. The illustrated diagram of FIG. 1A illustrates groupings of SRSs 102 and OSSs 104 to demonstrate storage and/or transportation of objects 105 to common locations at which handling operations may be commonly performed. In various embodiments, the operator workstation 110 may be positioned at a common location such that objects 105 are received at the operator workstation 110 (e.g., via one or more OSSs 104) and can be appropriately handled.

Indeed, objects 105 may be transported via SRSs 102, OSSs 104, human operation, and/or the like to the operator workstation 110 upon which one or more operators 120 may perform handling operations with the objects 105 upon the operator workstation 110. Specifically, in various embodiments, the operator workstation 110 includes a workbench platform having an upper surface portion upon which objects 105 may be deposited and handled upon. Although not explicitly in FIG. 1A, the workbench platform of the operator workstation 110 is configurable for at least one object 105 to be handled by at least one operator 120, and in various embodiments, the workbench platform is scalable such that a number of objects 105 can be handled each by an operator 120.

In various embodiments, handling operations may be performed with objects 105 upon the operator workstation 110 by human operators 120A, robotic operators 120B, and/or some combination thereof. Robotic operators 120B may be controlled via programmable logic control (PLC), and may be controlled remotely or via a wired connection. In various embodiments, the central management system

101 may be configured to control a plurality of robotic operators 120B throughout the object handling environment 100. Some other example robotic operators 120B may autonomously operate, such as using artificial intelligence and machine learning applications for vision and decision-making, generally. In some examples, robotic operators 120B and/or human operators 120A may be assigned to and positioned by various locations to which objects 105 are transported via OSSs 104 for handling.

In order to appropriately handle objects 105 within the object handling environment 100, and specifically upon a workbench platform of the operator workstation 110, operators 120 are capable of causing various degrees of movement of a given object. For instance, a robotic operator 120B may include at least an articulated arm that is controllable (e.g., via artificial intelligence (AI), via a remote human operator) to cause six degrees of freedom (6DOF) movement with an object 105 in order to perform handling operations.

Thus, within an object handling environment 100 as exemplified in FIG. 1A, objects 105 may be stored and transported to certain locations at which operators 120 may perform handling operations with the objects 105. As illustrated in FIG. 1A, the operator workstation 110 includes mobility means 114 enabling the operator workstation 110 to move and/or to be moved to a position at which objects 105 may be deposited upon the workbench platform of the operator workstation 110 and at which one or more operators 120 can perform their handling operations with the deposited objects. In some examples, certain operators may be assigned to and positioned (e.g., statically, fixedly) near a location to which objects 105 are transported, and the mobility means 114 enable an operator workstation 110 to be moved, for example, between respective endpoints of one or more OSSs 104 and operators 120 assigned to and/or positioned at that location. Further, the mobility means 114 of the operator workstation 110 enable the operator workstation 110 to be used for handling operations across many different locations throughout the object handling environment 100. In the illustrated embodiment, for instance, three locations to which objects 105 are transported for handling are shown, and the operator workstation 110 can move via mobility means 114 between said three locations for handling operations at each location. In some embodiments, the operator workstation 110 may itself include robotic operators 120B or other equipment configured to cause movement of objects 105 disposed upon the operator workstation 110 for performance of handling operations.

In various embodiments, the mobility means 114 of the operator workstation 110 may include one or more wheels, casters, tires, treads, bearings, motors, brakes, and/or the like. The mobility means 114 may be motorized such that the movement of the operator workstation 110 may be controlled (e.g., automated via AI, remotely controlled), and in other examples, the mobility means 114 are passive such that a human operator 120A may accompany the operator workstation 110 and cause its movement (e.g., via pushing the operator workstation 110).

In some example embodiments, the operator workstation 110 includes a controller 112. The controller 112 may be specific or dedicated to the operator workstation 110 and configured to control functionality related to the operator workstation 110. For instance, in some examples, the controller 112 may be configured to control movement of the operator workstation 110 via its mobility means 114 to different locations within the object handling environment 100. In various embodiments, the operator workstation 110 includes a plurality of sensors, data collection devices, and equipment for detection of object presence and object states during handling, and the controller 112 is configured to collect data from, control, and/or be in communication with such sensors, devices, and equipment. The controller 112 of an operator workstation 110 may be further configured to communicate with the central management system 101 of the object handling environment 100, such as for the exchange of collected data. Various other example operator workstations 110, in accordance with various embodiments, may not include a controller 112 and functions thereof (e.g., collection of data from sensors, devices, equipment of an operator workstation) may instead be performed by the central management system 101.

Figure 1B:
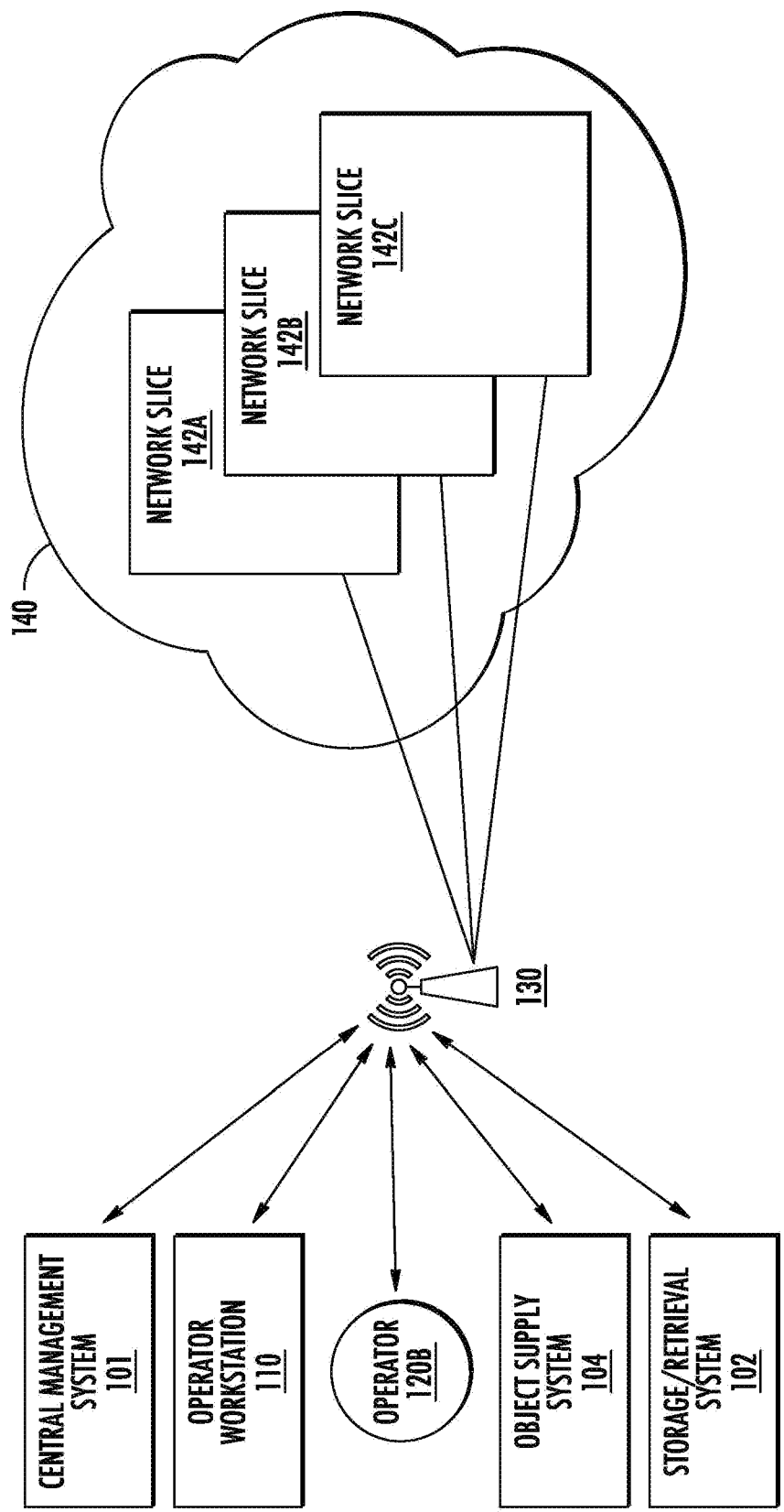
FIG. 1B provides an architectural diagram illustrating network communication within an object handling environment including an operator workstation, in accordance with various embodiments of the present disclosure.

Referring now to FIG. 1B, a diagram is provided to illustrate communication between different systems, components, and devices within the object handling environment 100. For instance, a central management system 101, an operator workstation 110 and components thereof (e.g., sensors, data collection devices, equipment, controller 112, mobility means 114), one or more robotic operators 120B, one or more OSSs 104, one or more SRSs 102, and/or the like may be in communication with one or more of each other. Although not explicitly illustrated, other devices and equipment within the object handling environment 100 may be in communication, such as various user equipment (e.g., cell phones, tablets, laptops, terminals) used by human operators 120A within the object handling environment 100.

In various embodiments, at least some of the communication with different participants within the object handling environment 100 may be wired communication executed using a wired data transmission protocol, such as but not limited to fiber distributed data interface (FDDI), digital subscriber line (DSL), Ethernet, asynchronous transfer mode (ATM), frame relay, of data over cable service interface specification (DOCSIS).

In various embodiments, communication between each of said systems, components, devices, and/or the like may be wireless as enabled by a wireless network 140 via a wireless access point 130, in various embodiments. In various embodiments, the wireless access point 130 may be positioned within the object handling environment 100, or similarly, the object handling environment 100 may include a plurality of wireless access points 130 in order to provide network communication. In various embodiments, communication between the operator workstation 110 (and its components) and other participants including the central management system 101 may be wireless such that the operator workstation 110 is fully mobile and free to traverse the object handling environment 100 via its mobility means 104 without being constrained by physical communication wiring. Generally, wireless communication within an object handling environment 100 may advantageously reduce required wiring infrastructure.

In providing wireless communication to an object handling environment 100, the wireless network 140 may use any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, or wireless universal serial bus (USB) protocols. In various embodiments, the wireless network 140 may be a broadband cellular network.

In order to maintain adequate quality or to reach a desired quality of wireless network communication throughout different participants throughout the object handling environment 100, the wireless network 140 may particularly use a network protocol capable of network slicing such that various communications between different participants are handled through different network slices. For instance, the wireless network 140 may be a $5^{th}$ generation new radio (5G) network configured to provide network services with different requirements via multiple network slices using software defined networking and network function virtualization. Accordingly, the wireless access point 130 may be configured to enable access of participants within the object handling environment 100, including at least the central management system 101 and the operator workstation 110, to a 5G network; for instance, the wireless access point 130 is an eNodeB, a gNodeB, or a ng-NodeB.

In various embodiments, the wireless network 140 is configured to provision at least a first network slice 142A, at least a second network slice 142B, and at least a third network slice 142C such that the wireless network 140 can provide at least three different network services. In an example embodiment, the first network slice 142A may be configured with high bandwidth communication requirements, the second network slice 142B may be configured with low power high density communication requirements, and the third network slice 142C may be configured with reliability and low latency communication requirements. In various embodiments in which the wireless network 140 is a 5G network, the first network slice 142A, the second network slice 142B, and the third network slice 142C are respectively configured with 5G enhanced mobile broadband (eMBB) requirements, 5G massive machine type communication (mMTC) requirements, and 5G ultra-reliable low latency communication (uRLLC) requirements, for example.

With the first network slice 142A providing a network service associated with high bandwidth communication requirements (e.g., 5G eMBB), the first network slice 142A of the wireless network 140 may be dedicated for wireless communications between the central management system 101 and the operator workstation 110 that involve video streaming and analytic data computing, for example. For instance, the operator workstation 110 may include one or more video cameras, and the operator workstation 110 may provide a live video stream during handling of objects 105 to the central management system 101 via the first network slice 142A due to the high bandwidth nature of video streaming, generally. As another example, large amount of collected sensor data may be communicated between the operator workstation 110 to the central management system 101 for analytic functions, such as classifying object types and classifying handling operations, via the first network slice 142A. For instance, the first network slice 142A may be used in broadband edge and/or distributed computing applications where computationally-intensive machine learning and computer vision algorithms may be performed remotely with large volumes of data.

In various embodiments, the second network slice 142B—with its low power and high density communication requirements—may be used for wireless communication between a large population of individual sensors, data collection devices, and equipment throughout the object handling environment 100. For instance, multiple sensors present at the operator workstation 110, conveyor overhead units at an OSS 104, lighting devices throughout the environment, and/or the like may wirelessly communicate with various controllers or systems (e.g., central management system 101, controller 112) via the second network slice 142B. In one example, the second network slice 142B may support Internet-of-Things type communications within the object handling environment 100.

The third network slice 142C being associated with reliability and low latency requirements may be used for wireless communication involving remote control of various systems and machinery throughout the object handling environment 100, in various embodiments. For instance, remote control of one or more SRSs 102 and/or OSSs 104 by the central management system 101 (e.g., to control conveyor speed, to specify transport of an object type, and/or the like) may be serviced by the third network slice 142C. Similarly, fine remote control of various equipment including robotic operators 120B to cause movement of objects 105 during handling operations may also be serviced by the third network slice 142C, or generally a network slice 142 associated with reliability and low latency requirements.

Thus, in various embodiments, various systems and devices within the object handling environment 100 may be configured for wireless network communication with one another, and in particular, the operator workstation 110 and various components thereof wireless communicate to fulfill its mobility. Wireless network communication can be optimized through different network slices having different communication requirements.

Figure 2:
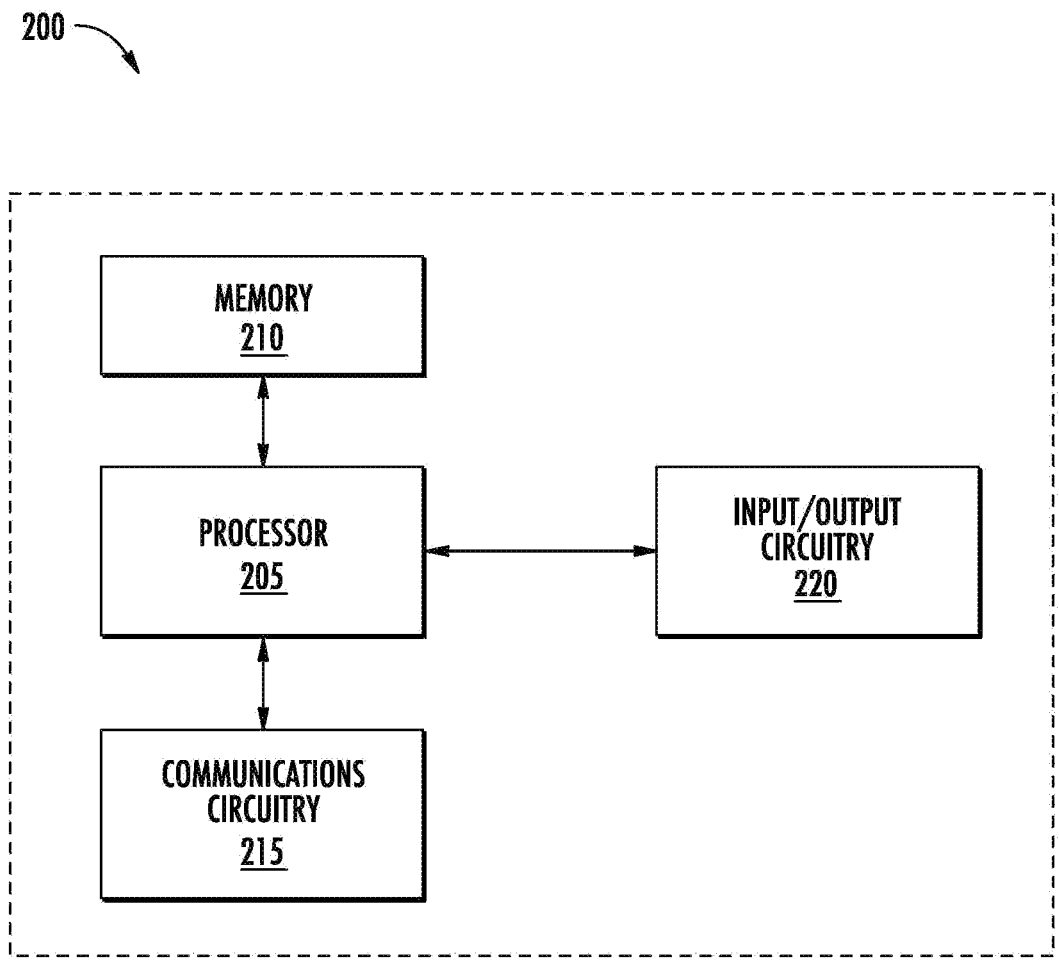
FIG. 2 schematically illustrates an exemplary apparatus for implementing various embodiments of the present disclosure.

Referring now to FIG. 2, an exemplary block diagram of an apparatus 200 is provided. In various embodiments, the apparatus 200 may be embodied by the central management system 101 and/or a controller 112 of the operator workstation 110. As illustrated in FIG. 2, the apparatus 200 may comprise a processor 205, a memory 210, communications circuitry 215, and input/output circuitry 220. The apparatus 200 may be configured to execute (e.g., perform) one or more of the various operations described herein. For instance, the apparatus 200 (as embodied by the central management system 101 or the controller 112) may be configured to execute various analytic functions on collected sensor data to determine the presence of objects 105 upon the operator workstation 110 and the states thereof in relation to various handling operations. As a further example, the apparatus 200 may be configured to render various user interfaces for display regarding the performance of various handling operations. As an even further example, the apparatus 200 may be configured to map a route through the object handling environment 100 that the operator workstation 110 should travel (via its mobility means 114).

Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus 200 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 provide or supplement the functionality of particular circuitry. For example, the processor 205 may provide processing functionality, the memory 210 may provide storage functionality, the communications circuitry 215 may provide network interface functionality, and the like.

In some embodiments, the processor 205 (and/or co-processor or any other processing circuitry assisting or otherwise associated with the processor) may be in communication with the memory 210 via a bus for passing information among components of the apparatus. The memory 210 may be non-transitory and may include, for example, one or more volatile and/or non-volatile memories. For example, the memory 210 may be an electronic storage device (e.g., a computer readable storage medium). In various embodiments, the memory 210 may be configured to store information, data, content, applications, instructions, or the like, for enabling the apparatus 200 to carry out various functions in accordance with example embodiments of the present disclosure. It will be understood that the memory 210 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. For example, the memory 210 may be configured to store footprints that represent or describe frequency spectrum data at reference positions.

The processor 205 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 205 may be configured to execute instructions stored in the memory 210 or otherwise accessible to the processor 205. Alternatively, or additionally, the processor 205 may be configured to execute hard-coded functionality. As such, whether configured by hardware or software methods, or by a combination thereof, the processor 205 may represent an entity (e.g., physically embodied in circuitry) capable of performing operations according to an embodiment of the present disclosure while configured accordingly. Alternatively, as another example, when the processor 205 is embodied as an executor of software instructions, the instructions may specifically configure the processor to perform the algorithms and/or operations described herein when the instructions are executed.

The communications circuitry 215 may be a device or circuitry embodied in either hardware or a combination of hardware and software that is configured to receive and/or transmit data from/to a network and/or any other device, circuitry, or module in communication with the apparatus 200. For example, the communications circuitry 215 may be configured to communicate with one or more computing devices via wired (e.g., USB) or wireless (e.g., 5G, cellular, Bluetooth, Wi-Fi, and/or the like) communication protocols. For instance, the communication circuitry 215 may include one or more radio antennas for communicating with a wireless network 140, or a 5G network.

In some embodiments, the apparatus 200 may include input/output circuitry 220 that may, in turn, be in communication with the processor 205 to provide output to the user and, in some embodiments, to receive input such as a command provided by the user. The input/output circuitry 220 may comprise a user interface, such as a graphical user interface (GUI), and may include a display that may include a web user interface, a GUI application, a mobile application, a client device, or any other suitable hardware or software. In some embodiments, the input/output circuitry 220 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 205, input/output circuitry 220 (which may utilize the processing circuitry), or both may be configured to control one or more functions of one or more user interface elements through computer-executable program code instructions (e.g., software, firmware) stored in a non-transitory computer-readable storage medium (e.g., memory 210).

In some embodiments, the apparatus 200 does not interact directly with the user, and the apparatus 200 may generate user interface data for display via input/output circuitry of one or more other devices with which one or more users directly interact and transmit the generated user interface data to one or more of those devices. For example, the apparatus 200, using user interface circuitry may generate user interface data for display by one or more display devices and transmit the generated user interface data to those display devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While apparatus 200 may be embodied by the central management system 101 and/or the controller 112 as previously described, other systems, computing devices, controllers, user equipment, and/or the like within the object handling environment 100 may include similar features, including one or more processors and memory (e.g., similar to processor 205 and memory 210). As discussed, other user equipment can communicate via the wireless network 140 and may thereof include communications circuitry configured for wireless communication via the wireless network 140.

Figure 3A:
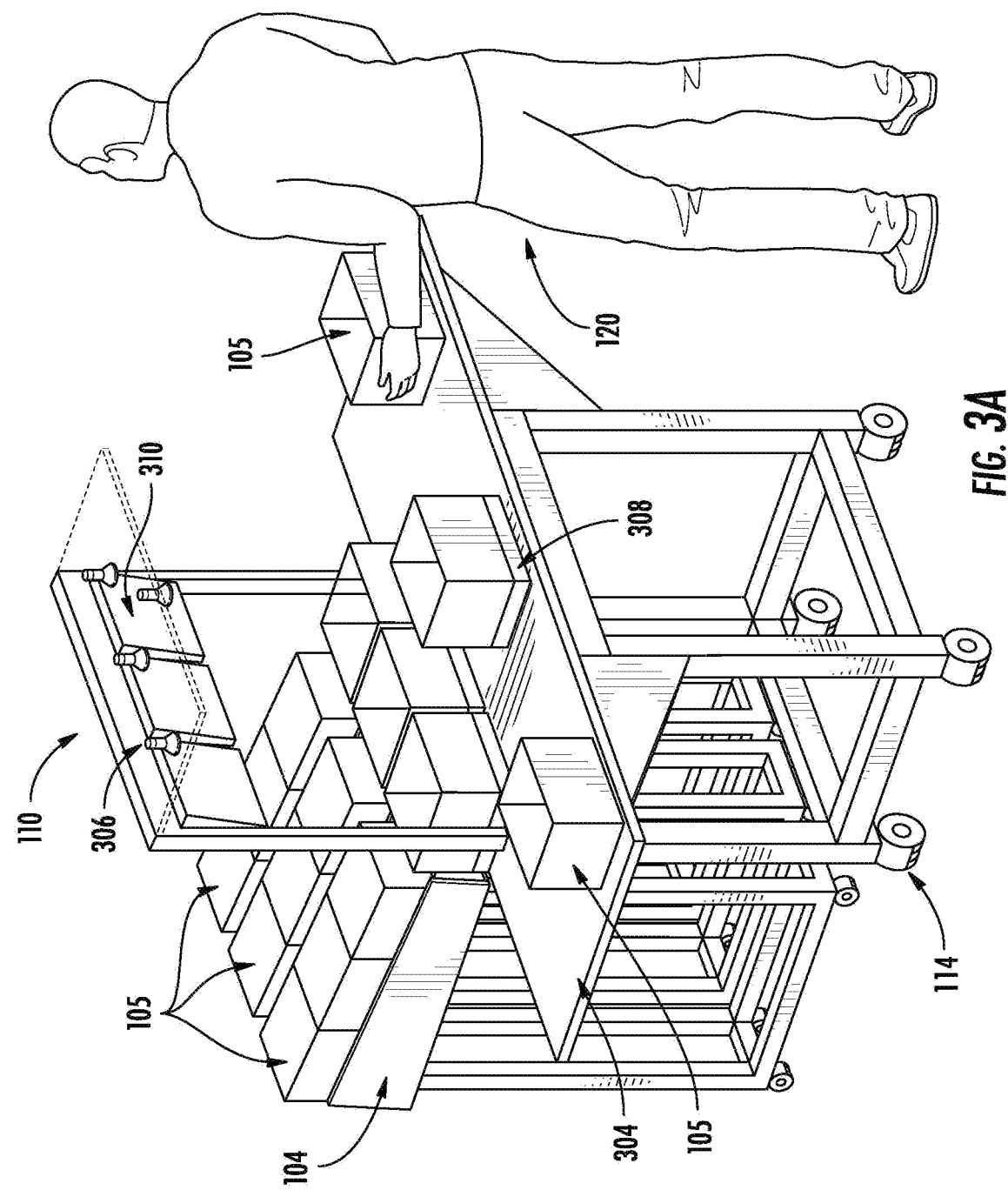
FIGS. 3A and 3B illustrate exemplary operator workstations for object handling by operators, in accordance with various embodiments of the present disclosure.
Figure 3B:
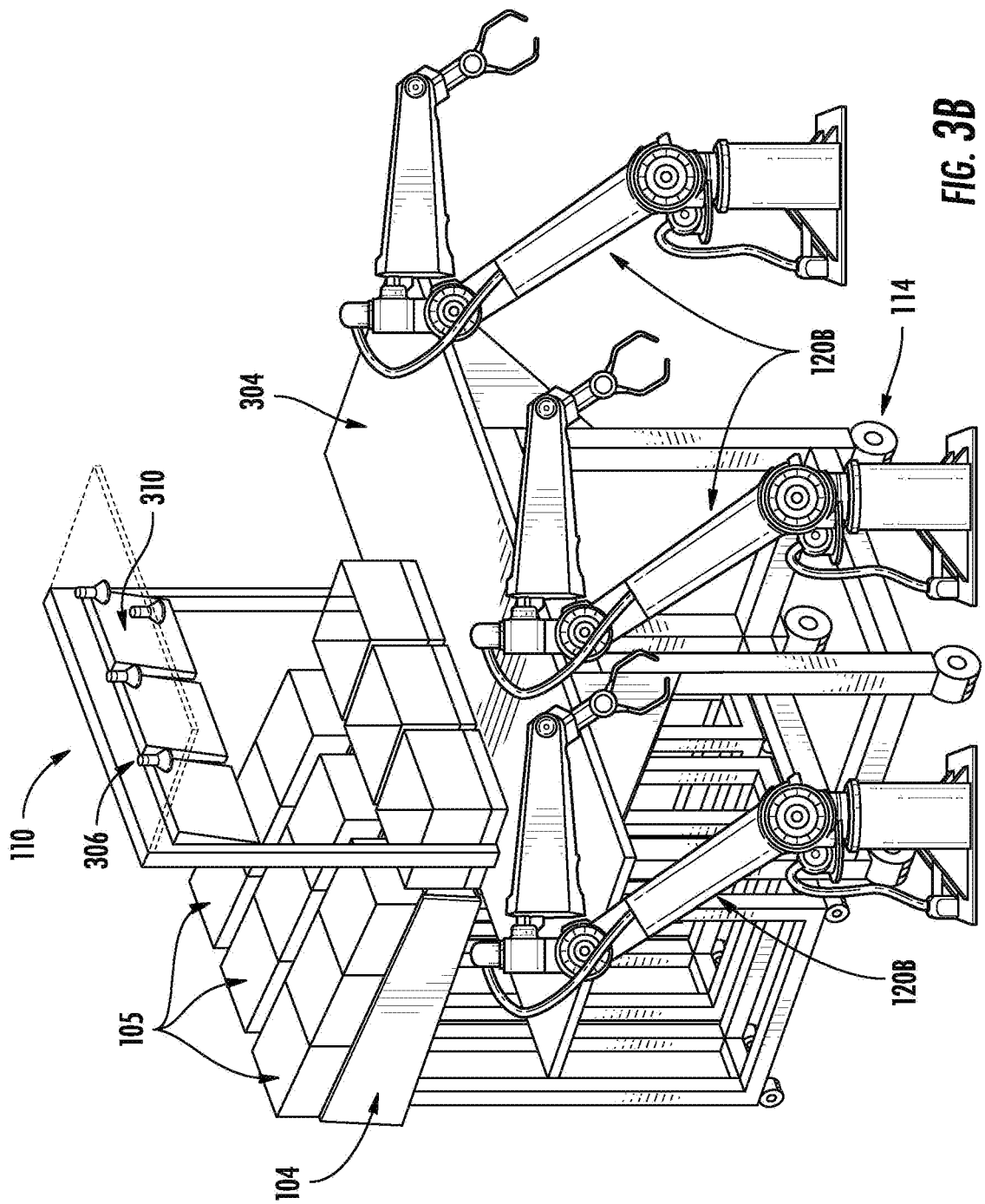

Referring now to FIGS. 3A and 3B, example operator workstations 110 are illustrated. In various embodiments, an operator workstation 110 may be used for handling operations performed by operators 120, and the operators 120 may include human operators, as shown in FIG. 3A, and/or robotic operators 120B, as shown in FIG. 3B. Although FIG. 3A illustrates one operator 120, an operator workstation 110 may be used by multiple operators 120 at the same time for simultaneous and coordinated performance of handling operations, and the multiple operators can include any combination of human operators 120A and robotic operators 120B.

As illustrated in FIGS. 3A and 3B, an operator workstation 110 includes mobility means 114 enabling the operator workstation 110 to move and/or to be moved to different locations. For instance, the illustrated embodiments depict four casters positioned at the base of the operator workstation 110. Accordingly, the operator workstation 110 may be moved to be positioned near and/or adjacent to an SRS 102, one or more OSSs 104, or generally wherever objects 105 may be located (e.g., accumulated).

In FIGS. 3A and 3B, the operator workstation 110 is positioned adjacent to an OSS 104 configured to output three objects 105 at a time (e.g., via three separate conveyor lines). As shown, the operator workstation 110 may be positioned such that the OSS 104 may directly deposit objects 105 onto the workbench platform 304 of the operator workstation 110. In various embodiments, the functioning of the OSS 104 may be controlled (e.g., by central management system 101), such as to control the velocity of object transportation based at least in part on whether the operator workstation 110 and/or the operators 120 are ready to accept objects 105 from the OSS 104. For instance, collected sensor data at the operator workstation 110 may indicate that a number of objects 105 may presently be disposed upon the workbench platform 304, and upon receipt and/or analysis of the collected sensor data, the central management system 101 may prevent the OSS 104 from depositing further objects 105 upon the workbench platform 304, in some examples.

In various embodiments, the workbench platform 304 may specifically include an accumulation area at which objects 105 are directly deposited, and the operators 120 may move objects 105 from the accumulation area of the workbench platform 304 to a different portion or area of the workbench platform 304 that may be more convenient and/or more directly accessible for performance of handling operations.

As shown, the workbench platform 304 may be at least substantially horizontal and planar. That is, the workbench platform 304 may specifically define an upper planar surface upon which objects 105 may rest. In some embodiments, the upper planar surface of the workbench platform 304 may be coated in material configured to promote friction and to prevent slippage of objects 105 along the upper planar surface.

In various embodiments, the workbench platform 304 is positioned at a height at which handling operations can be easily performed upon the objects 105 resting upon the workbench platform 304. For instance, the workbench platform 304 may be between an approximate waist level and an approximate chest level of an average human operator. As another example, the workbench platform 304 may be at a height reachable by a robotic operator 120B and at which the robotic operator 120B maintains relatively complete articulated movement and control. In the illustrated embodiment, the workbench platform 304 is suspended above the mobility means 114 via a structure or a scaffolding. In some example embodiments, the height of the workbench platform 304 may be dynamically adjustable. For instance, the structure upon which the workbench platform 304 is suspended may include various actuators, hydraulic mechanisms, springs, motors, and/or the like operable to change the height of the workbench platform 304. Accordingly, the operator workstation 110 may be adaptable for use with different operators having different heights, for example.

Figure 4A:
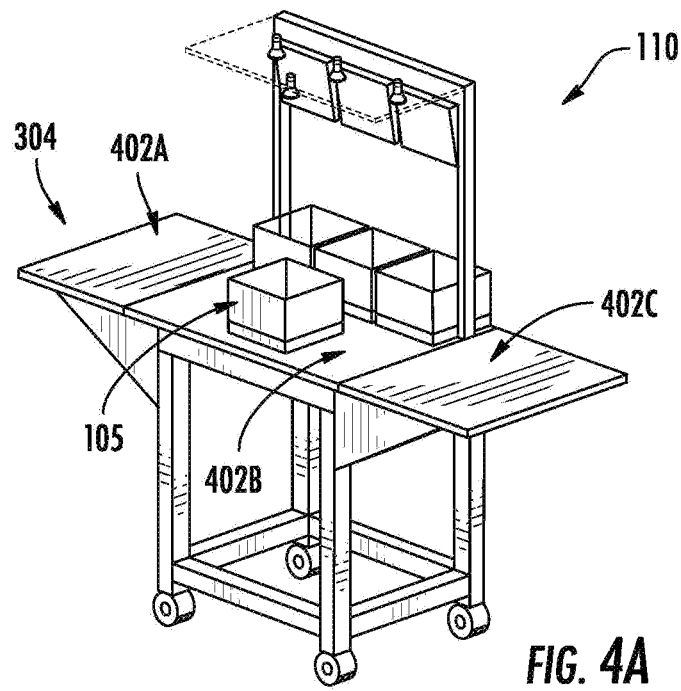
FIGS. 4A, 4B, and 4C illustrate diagrams demonstrating exemplary scalability properties of an operator workstation in accordance with various embodiments of the present disclosure.
Figure 4B:
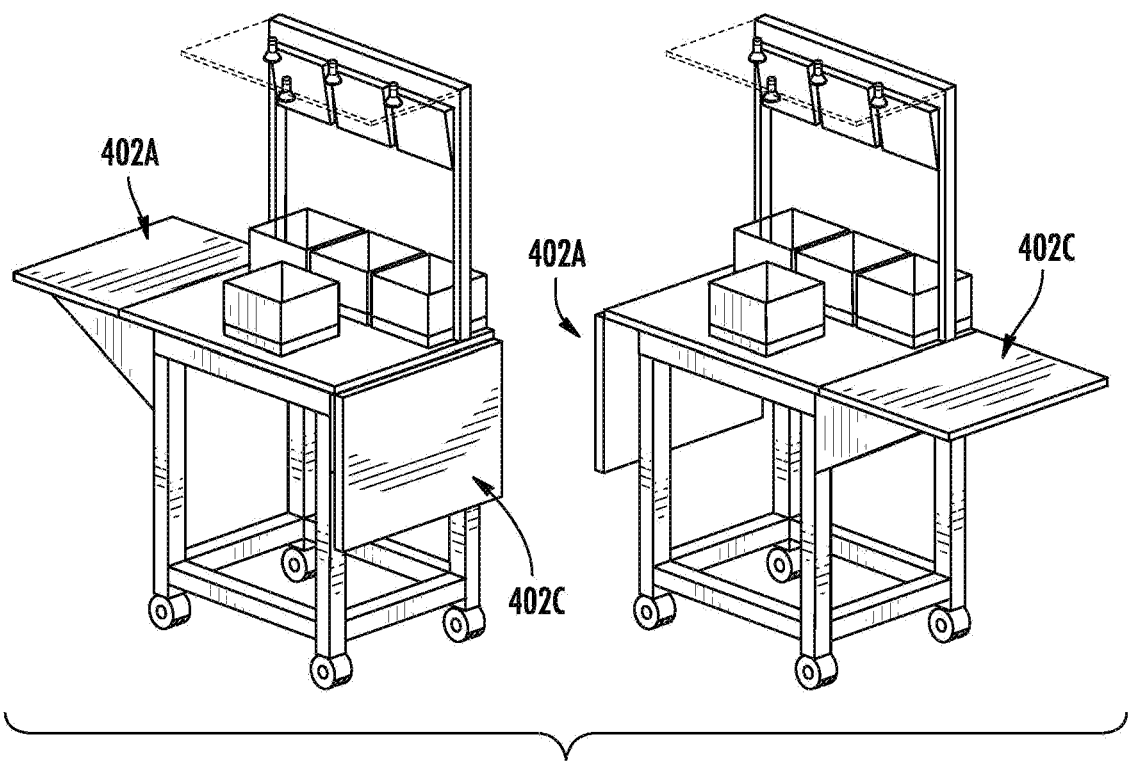
Figure 4C:
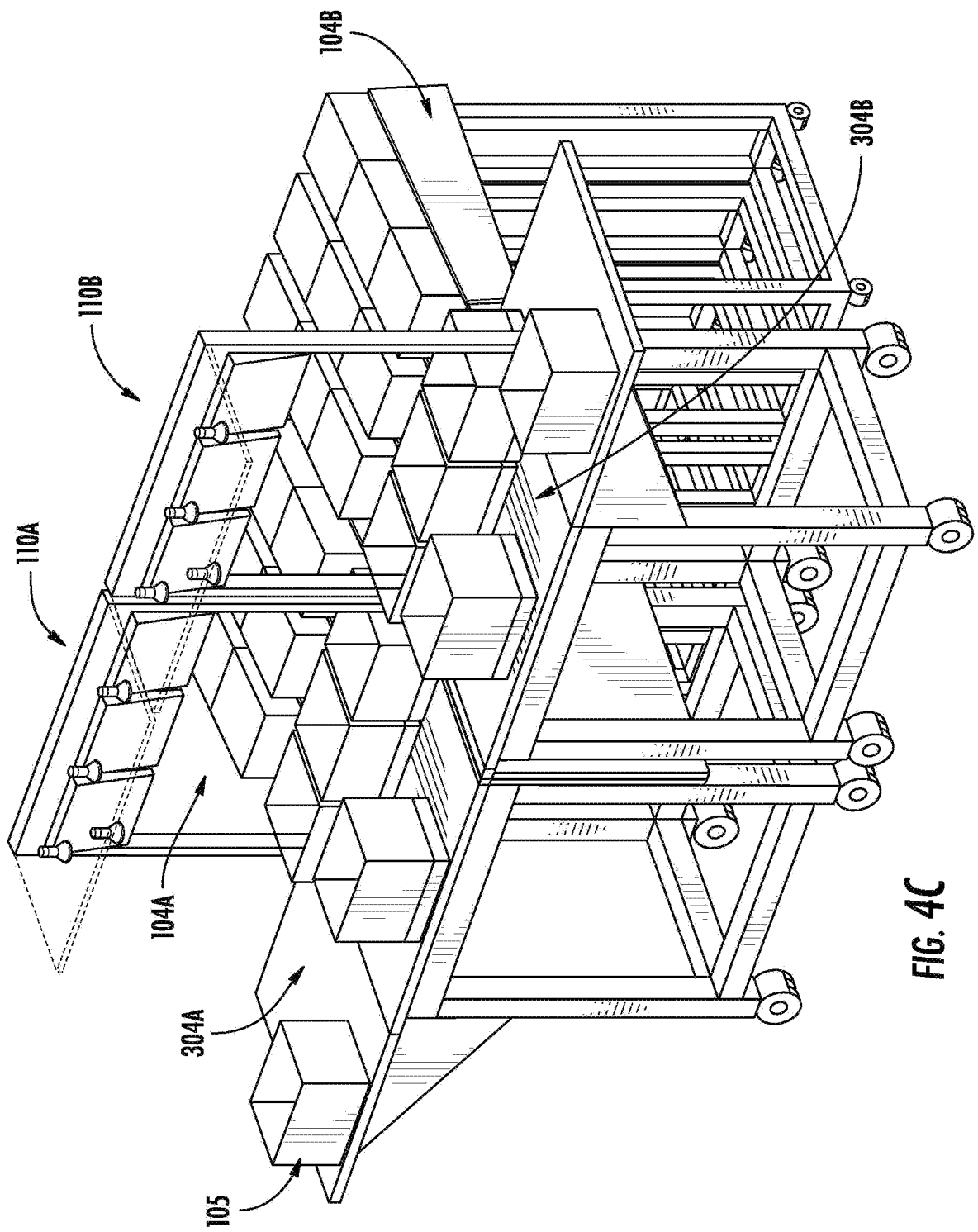

As previously discussed, the workbench platform 304 of an operator workstation 110 may provide scalability in object handling, generally. FIGS. 4A, 4B, and 4C demonstrate scalability features of the workbench platform 304 and the operator workstation 110 generally. In various embodiments, the workbench platform 304 includes one or more sub-platforms 402. The one or more sub-platforms 402 may be joined together to form the workbench platform 304 via collapsible, foldable, and/or the like features. For instance, a hinging mechanism may join two sub-platforms 402, and the two sub-platforms 402 can be placed in a compact configuration via the hinging mechanism.

FIG. 4A specifically illustrates a workbench platform 304 having three sub-platforms 402 (e.g., sub-platforms 402A, 402B, 402C) deployed in an expanded configuration. Accordingly, the workbench platform 304 in its expanded configuration, as exemplified in FIG. 4A, may have its maximal surface area upon which handling operations can be performed.

FIG. 4B illustrates the workbench platform 304 being deployed into its compact configurations. In one compact configuration, sub-platform 402C is hinged or folded down such that only sub-platforms 402A and 402B are available for use in handling operations. In another compact configuration, sub-platform 402A may alternatively be hinged or folded down such that only sub-platforms 402B and 402C are available. In yet another compact configuration (not explicitly illustrated), both sub-platforms 402A and 402C may be hinged or folded down; that is, any number of sub-platforms can be available or not available.

In various embodiments, multiple operator workstations 110 can be used together to provide an expanded surface area upon which handling operations can be performed. In FIG. 4C, two operator workstations 110A and 110B are positioned adjacent together such that their respective workbench platforms (304A and 304B) can form a continuous surface. In the illustrated embodiment, one of the sub-platforms 402 of each respective workbench platform is hinged or folded down such that the total surface available for handling operations includes four sub-platforms. For instance, it may have been determined that four sub-platforms would be necessary or optimal to provide adequate throughput when receiving objects from at least two OSSs 104 (e.g., OSSs 104A and 104B). Accordingly, as demonstrated, the surface area provided by one or more operator workstations 110 for handling operations can be appropriately scalable for different applications. In some examples, the number of sub-platforms and/or the amount of desired surface area may be based at least in part on the number of operators 120 to be working at the operator workstation 110, a number of different objects 105 being supplied by the OSS 104, a number of different handling operations to be performed simultaneously, and/or the like.

Returning to FIGS. 3A and 3B, the operator workstation 110 includes a plurality of sensors, data collection devices, and equipment configured to collect data for detection of objects 105 present upon the workbench platform 304 and classification of the states thereof. For instance, the operator workstation 110 includes one or more data and/or image collection devices 306, which can include but are not limited to cameras, video cameras, x-ray imaging devices, light detection and ranging (LiDAR) devices, sonar devices, radar devices, spectrometers, chromameters, and/or the like. In various embodiments, the image collection devices 306 are generally oriented towards the upper planar surface of the workbench platform 304 as to collect images and/or large sets of data from objects 105 disposed upon the upper planar surface. In some examples, the image collection devices 306 are positioned at a height at least above the workbench platform 304. The image collection devices 306 may be configured to capture data as handling operations are performed, such as by recording videos or collecting time-span data.

Various image collection devices 306, such as cameras or other devices that collect large volumes of data, may communicate over the wireless network 140 and provide their collected data to various other systems and devices such as the central management system 101. In particular, network communication for at least some of the image collection devices 306 of the operator workstation 110 is provided by a network slice 142 of the wireless network 140 associated with high bandwidth requirements, such as the first network slice 142A associated with 5G eMBB communication requirements. Accordingly, with network communication, image collection devices 306 may provide a plurality of captured images, a live video stream, large datasets, and/or the like to the central management system 101, for example.

As further illustrated by FIG. 3A, the operator workstation 110 may further include data collection devices 308 also configured to generally collect data concerning objects 105 disposed upon the workbench platform 304. In the illustrated embodiment, the data collection devices 308 include weight sensors, and in various embodiments, the data collection devices 308 may further include laser-based detection devices, temperature sensors, electronic calipers or length measurement devices, and/or the like. Data collected by the data collection devices 308 can be used to determine a weight of the object 105, determine a temperature of the object 105, verify that an object 105 is disposed upon a particular sub-platform 402, and/or generally verifying that certain handling operations were performed.

FIG. 5 illustrates an example operator workstation 110 having one or more data collection devices 308 configured to measure a weight of an object 105, the data collection devices 308 being weight sensors, for example. In the illustrated embodiment, the weight sensors are positioned upon workbench platform 304, and objects 105 may be placed upon the weight sensors (e.g., by operators 120, by OSS 104). In some examples, weight sensors may additionally or alternatively be embedded into the workbench platform 304 and/or into the structure supporting the workbench platform 304 such that weights of objects 105 placed upon the workbench platform 304 can be measured.

As shown in FIG. 5, various weight sensors can be positioned throughout the workbench platform 304 for measurement and data collection for the objects 105 at different points in time. In the illustrated embodiment, objects 105 may be delivered at a distal portion of the workbench platform 304 by one or more OSSs 104, and the operator workstation 110 includes three weight sensors (e.g., data collection device 308A) at the distal portion (e.g., an accumulation area) where the weights of the objects 105 may be measured upon delivery. Accordingly, data collected by such weight sensors can be used (e.g., by controller 112, by central management system 101) to verify accuracy of object delivery, or specifically to verify that the correct objects 105 were delivered to the operator workstation 110.

As discussed, objects 105 may be specifically handled at a portion of the workbench platform that is more accessible to operators 120, such as a proximal portion as exemplified in the illustrated embodiment. Accordingly, in the illustrated embodiment, the operator workstation 110 includes a weight sensor (e.g., data collection device 308B) configured to collect data while handling operations are being performed with an object 105. For instance, the object 105 may be positioned atop the weight sensor (e.g., data collection device 308B) while an operator 120 performs handling operations with the object 105. Accordingly, an operator workstation 110 generally includes data collection devices 308 in some configuration enabling data to be collected at various times such that accuracy of handling operations can be verified.

As discussed, data collected by the data collection devices 308 may be communicated via the wireless network 140 for further analysis, including the detection of object presence and object states. In some examples, such network communication involving collected data may involve the second network slice 142B, or a network slice 142 associated with low power high density communication requirements (e.g., 5G mMTC requirements). In particular, such communications may be serviced by the second network slice 142B due to lower bandwidth needed compared to image data and video streaming, which may be serviced by the first network slice 142A instead, in some examples.

In various embodiments, the operator workstation 110 may include further devices and equipment, such as user input devices enabling an operator 120 to provide input. For example, the operator workstation 110 may include a button, switch, and/or the like enabling an operator 120 to indicate that a certain handling operation has been completed, or that the OSS 104 should supply one or more additional objects 105 to the operator workstation 110.

The operator workstation 110 further includes one or more displays 310, in various embodiments. The one or more displays 310 may be used for informative purposes for the operators 120 at the operator workstation 110 such as to indicate instructions for a handling operation, a quota of objects 105 to handle, a detected object type of objects 105 disposed upon the workbench platform 304, and/or the like. In some examples, each display 310 may indicate instructions for different handling operations that are performed simultaneously at the operator workstation 110 by different operators 120, and each display 310 may accordingly correspond to an operator 120. As previously discussed, each operator 120 may perform handling operations at a corresponding sub-platform 402 of the workbench platform 304, and as a result, the number of displays 310 that are used may correspond to the number of sub-platforms 402 being deployed for the operator workstation 110. In some examples, the configuration of the operator workstation 110, or the number of sub-platforms 402 being deployed, may be known, and one or more displays 310 in surplus may be temporarily deactivated or turned off to conserve power.

In some examples, the displays 310 may be configured to provide a live and/or magnified video stream captured by image collection devices 306 to aid operators 120 in their performance of handling operations. In such embodiments, displays 310 may be configured for direct communication with image collection devices 306 for said video stream. In further example embodiments, displays 310 may receive a video stream via the wireless network 140, and in particular, the video stream may be provided to the displays 310 via a network slice 142 of the wireless network 140 such as the first network slice 142A associated with high bandwidth communication requirements.

In various embodiments, the displays 310 may be positioned at a height and position such that the displays 310 are visible to one or more operators 120 at the operator workstation 110. In some examples, such as the illustrated embodiments shown in FIGS. 3A and 3B, the displays 310 may be fixedly attached to an elevated vertical face (e.g., perpendicular to a horizontal plane defined by the workbench platform 304) that is positioned (e.g., suspended) above the workbench platform 304 by vertical supporting members. The elevated vertical face and its supporting members may additionally serve as a structure to which image collection devices 306 may be attached in a downwards-facing orientation to capture handling operations performed on the objects 105 below, in some examples. In various embodiments, the height at which the displays 310 are positioned may be adjustable, such as by user control and user input features present at the operator workstation 110.

Figure 6A:
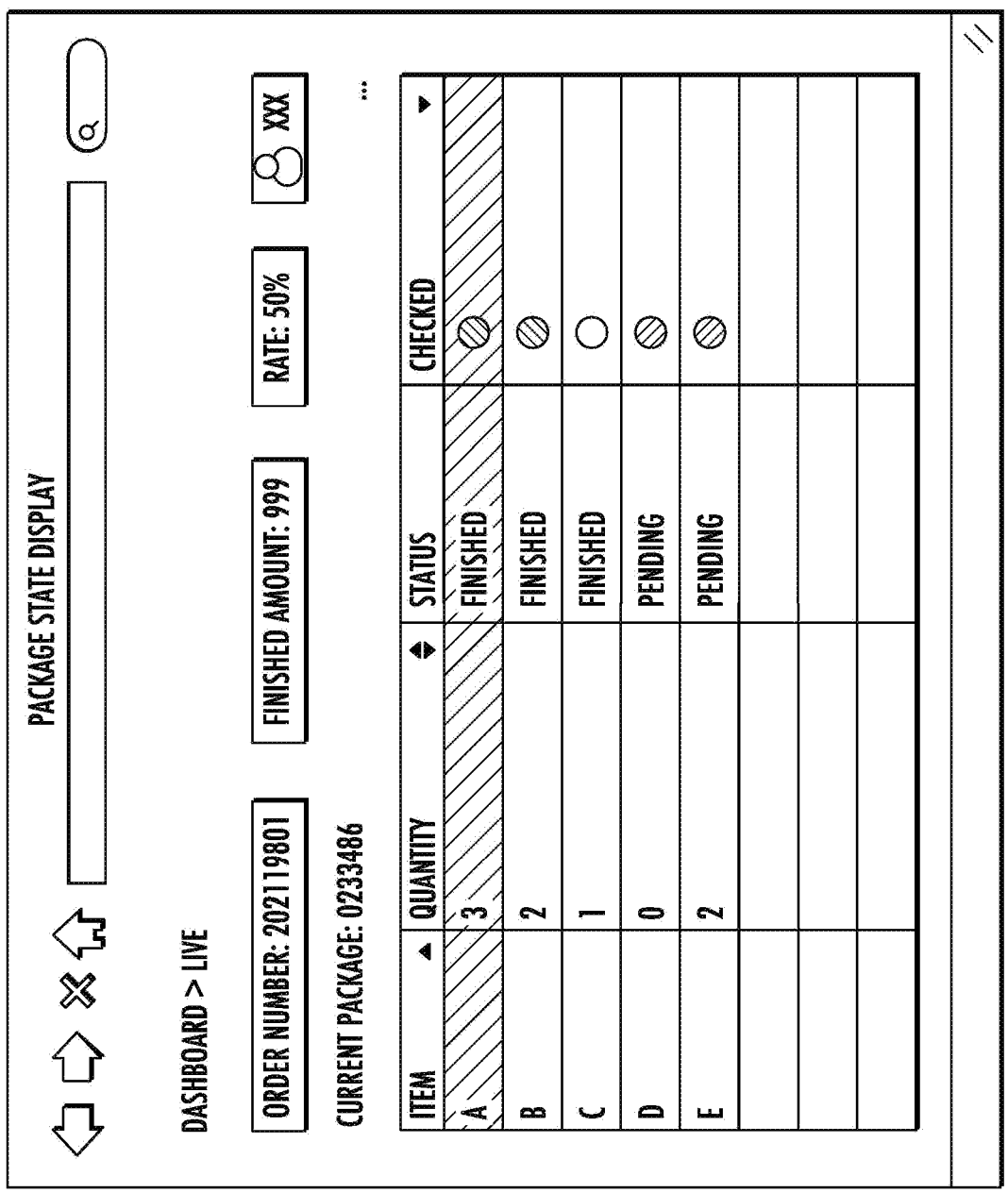

Similarly, displays 310 may render user interfaces received via the first network slice 142A of the wireless network 140 and/or render user interfaces based at least in part on analytic data received via the first network slice 142A. FIG. 6A illustrates a first user interface 602 that may be displayed via one or more displays 310 of an operator workstation 110. In some alternative embodiments, the first user interface 602 may be displayed at a display of a user equipment associated with an operator 120, a display at the central management system 101, generally a display positioned within the object handling environment 100, and/or the like.

In various embodiments, the first user interface 602 may be configured to indicate detected states of objects 105 presently being handled at an operator workstation 110. Specifically, an object state may describe the object 105 after a handling operation has been completed (e.g., a packaged state, a refrigerated state, an assembled state, a modified state), the object 105 before a handling operation has been initiated (e.g., an unpackaged state, an un-refrigerated state, an unassembled state, an unmodified state), the object 105 during performance of a handling operation (e.g., a semi-packaged state, a semi-refrigerated state, a semi-assembled state, a semi-modified state), and/or the like. Accordingly, an object state may be indicative of the progress of a handling operation, and as shown, the first user interface 602 may indicate a handling status such as "Finished" or "Pending" that is determined based at least in part on a determined object state.

The object state of each object 105 may be specifically determined and classified by the central management system 101 and/or the controller 112, in various examples. In various embodiments, the central management system 101 and/or the controller 112 may be configured to execute analytic functions, classification machine learning algorithms, and/or the like to determine an object state for each object 105 at the operator workstation 110 using data collected at the operator workstation 110. As an illustrative example, temperature data collected by temperature sensors at the operator workstation 110 (and communicated to the central management system 101 via the wireless network 140) may be used to determine a status of a refrigeration handling operation. As another illustrative example, weight data collected by weight sensors at the operator workstation 110 (and communicated to the central management system 101 via the wireless network 140) may be used to determine a status of an assembly or packing handling operation. As yet another illustrates example, image data collected by image collection devices 306 at the operator workstation 110 (and communicated to the central management system 101 via the wireless network 140) may be used to by image processing and/or computer vision algorithms to determine whether an object 105 has been packaged or not.

In various embodiments, a determined object state and associated handling status may be verified or checked by operators 120 at the operator workstation 110 via user input. In some examples, an operator 120 may be prompted to verify whether a detected completion of a handling operation is accurate, and the operator 120 may appropriately respond. The first user interface 602 may additionally indicate whether a determined object state and indicated handling status has been verified or checked by operators 120.

As shown in FIG. 6A, the first user interface 602 may also indicate various analytics regarding the performance of handling operations. In particular, the first user interface may indicate the amount of objects 105 that have been handled to completion (e.g., "Finished Amount") and a rate of completion. In various embodiments, the first user interface 602 that generally indicates object states and handling statuses may be provided via displays 310 during use of the operator workstation 110 such that operators 120 can be informed of their progress while performing handling operations. While not explicitly illustrated, the first user interface 602 and/or another user interface may also indicate handling instructions and/or a handling order spanning different operators and different areas of the operator workstations 110 in order to coordinate the simultaneous and related handling operations being performed at the operator workstation, in some examples.

Referring next to FIG. 6B, a second user interface 604 that may be displayed via one or more displays 310 of an operator workstation 110 is provided. Additionally or alternatively, the second user interface 604 may be provided via a display of a user equipment associated with an operator 120, a display of the central management system 101, and/or the like.

The second user interface 604 includes a configuration generator that may be used to determine an optimal configuration of the operator workstation 110 and its sub-platforms 402. Via the second user interface, aspects of handling operations can be provided for analysis and determination of the optimal configuration. For example, object types, object weights, an estimated performance time for different operations, and/or the like may be provided to the configuration generator in order to optimize the number of sub-platforms 402 and operators 120 that should be involved for an entire workflow of handling operations. For instance, in the illustrated embodiment, the second user interface 604 indicates that five operators should be involved, and three work stations (e.g., as defined by three sub-platforms 402) should be deployed. Accordingly, based at least in part on information indicated by the second user interface 604, the workbench platform 304 of the operator workstation 110 can be configured (e.g., by operators 120) with an optimal configuration for optimal throughput of object handling.

Accordingly, in various embodiments, operator workstations 110 may include displays 310 for conveying of relevant information to operators 120 for overall improvement of handling operation efficiency and connectiveness. While not explicitly illustrated, an operator workstation 110 may include further components, such as one or more batteries, power supplies, and/or the like configured to provide power to the one or more displays 310, sensors, image collection devices 306, data collection devices 308, motors, actuators, and/or the like, for example.

Therefore, as described herein, various embodiments of the present disclosure provide operator workstations 110 that improve the efficiency of handling operations of an object handling environment 100, thereby preventing adverse effects resulting from overflow or excess volume of objects at an object handling environment 100. Example operator workstations 110 described herein include a workbench platform 304 providing a scalable surface area upon which objects 105 may rest and where handling operations can be performed. With scalability, the workbench platform 304 can configured to optimize throughput of the handling operations. Further, in various embodiments, an operator workstation 110 includes a plurality of sensors, image collection devices 306, data collection devices 308, equipment, and/or the like that provide data used in improving accuracy and traceability of handling operations. The operator workstation 110 includes displays 310 that can assist operators 120 in their performance of handling operations, and the operator workstation 110 may also interact with and remotely control equipment and robotic operators 120 that perform the handling operations. In accordance with various embodiments, the operator workstation 110 features mobility throughout an object handling environment 100, and in realizing such mobility, data may be communicated to and from the operator workstation 110 via a wireless network. Such wireless network communication can be serviced through multiple network slices, such as slices of a 5G network, such that data can be efficiently, accurately, and reliably communicated.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An operator workstation for handling a plurality of objects, the operator workstation comprising:
a workbench platform having a configurable number of sub-platforms configured for at least one object of the plurality of objects to be disposed upon;
a plurality of sensors configured to collect sensor data for detection of an object presence and an object state of the at least one object being disposed upon the workbench platform;
one or more displays controlled to indicate the number of foldable sub-platforms determined based at least in part on an operation workflow associated with the plurality of objects, wherein the configurable number of the sub-platforms of the workbench platform is determined based on the collected sensor data; and
a plurality of equipment comprising at least one robotic operator, wherein the at least one robotic operator comprises at least one articulated arm, the plurality of equipment configured to control movement of the at least one object being disposed upon the workbench platform, the plurality of sensors and the plurality of equipment comprising:
one or more first sensors and equipment configured for network communication via a first network service provided by one or more wireless networks,
one or more second sensors and equipment configured for network communication via a second network service provided by the one or more wireless networks, and
one or more third sensors and equipment configured for network communication via a third network service provided by the one or more wireless networks.

2. The operator workstation of claim 1, wherein the first network service is associated with high bandwidth communication requirements, the second network service is associated with low power high density communication requirements, and the third network service is associated with reliability and low latency communication requirements.

3. The operator workstation of claim 1, wherein the plurality of equipment comprises one or more robotic operators remotely controlled through the network communication via the third network service to perform handling operations with the at least one object being disposed upon the workbench platform.

4. The operator workstation of claim 3, wherein the one or more wireless networks comprises a 5th generation new radio (5G) network, and wherein each of the first network service, the second network service, and the third network service is provided by a network slice of the 5G network.

5. The operator workstation of claim 1, wherein the configurable number of foldable sub-platforms is determined based at least in part on a handling workflow associated with the plurality of objects.

6. The operator workstation of claim 1, further comprising mobility means operable to position the operator workstation adjacent to one or more object supply systems, wherein the at least one object disposed upon the workbench platform originates from the one or more object supply systems.

7. The operator workstation of claim 6, wherein the one or more object supply systems are remotely controlled through the network communications via the third network service.

8. The operator workstation of claim 1, wherein:
the one or more displays are controlled to further indicate the object state of the at least one object being disposed upon the workbench platform.

9. The operator workstation of claim 8, wherein the one or more displays are controlled to further indicate instructions for performing one or more handling operations of the operation workflow associated with the plurality of objects.

10. The operator workstation of claim 8, wherein the number of displays that are controlled is based at least in part on at least one of: a number of concurrent handling operations being performed at the operator workstation, a number of the at least one object being disposed upon the workbench platform, or a number of operators at the operator workstation.

\* \* \* \* \*